US009521049B2

(12) United States Patent
Layman et al.

(10) Patent No.: US 9,521,049 B2
(45) Date of Patent: *Dec. 13, 2016

(54) METHOD AND SYSTEMS FOR AN INCOMING UNIDIRECTIONAL OUTAGE BYPASS FOR A VOICE OVER INTERNET PROTOCOL PRIVATE BRANCH EXCHANGE SYSTEM

(71) Applicant: Vocalocity, Inc., Atlanta, GA (US)

(72) Inventors: Randy Layman, Marietta, GA (US); Robert Michael Smith, Atlanta, GA (US); Keith Meyers, Powder Springs, GA (US); Barry Fleming, Roswell, GA (US)

(73) Assignee: VONAGE BUSINESS INC., Atlanta, GA (US)

( * ) Notice: Subject to any disclaimer, the term of this patent is extended or adjusted under 35 U.S.C. 154(b) by 434 days.

This patent is subject to a terminal disclaimer.

(21) Appl. No.: 13/831,728

(22) Filed: Mar. 15, 2013

(65) Prior Publication Data

US 2014/0140202 A1 May 22, 2014

Related U.S. Application Data

(63) Continuation-in-part of application No. 13/680,067, filed on Nov. 18, 2012.

(51) Int. Cl.
*H04L 12/24* (2006.01)
*H04L 12/26* (2006.01)

(52) U.S. Cl.
CPC ....... *H04L 41/5009* (2013.01); *H04L 41/0659* (2013.01); *H04L 41/5087* (2013.01); *H04L 43/08* (2013.01)

(58) Field of Classification Search
CPC ............. H04L 65/1053; H04L 65/1043; H04L 41/0659; H04L 41/5009; H04L 41/5087; H04L 41/0663; H04L 43/08; H04L 12/66; H04L 29/06292; H04L 41/0246; H04L 41/06; H04L 41/0654; H04L 45/28; H04L 61/1529; H04L 65/1006; H04L 65/1069; H04L 69/40; H04L 11/00; H04L 11/04; H04M 7/006; H04M 7/0084; H04M 7/009; H04M 7/1285; H04M 3/42314; H04M 3/0057; H04M 3/08; H04M 15/56; H04M 2203/404; H04M 2207/203; H04M 2215/202; H04M 2215/7414; H04M 3/5158; H04M 3/5232; H04M 5/42314; H04M 3/42323; H04M 7/0024; H04M 7/1205; H04M 2203/306; H04M 2203/408; H04M 2242/30; H04W 84/16
See application file for complete search history.

(56) References Cited

U.S. PATENT DOCUMENTS 6,363,065 B1 * 3/2002 Thornton ................ H04L 12/14
370/352
6,570,855 B1 * 5/2003 Kung ...................... H04L 65/80
370/237

(Continued)

OTHER PUBLICATIONS

International Search Report mailed Jul. 14, 2014 for Application PCT/US2014/026095.

(Continued)

*Primary Examiner* — Michael Thier
*Assistant Examiner* — Eric Nowlin
(74) *Attorney, Agent, or Firm* — Alexander Legal LLC; Joseph Pagnotta (57) ABSTRACT

A system and method are disclosed herein for providing a unidirectional outage bypass for incoming communications via a hosted Voice-over Internet Protocol (VoIP) private branch exchange (PBX) system to a session initiation pro- (Continued)

tocol (SIP) device. An outage monitoring system is in communication with both the unidirectional bypass system and one or more bypass enablers that act at the direction of the unidirectional bypass system. The outage monitoring system detects outages and overloads, as well as, network failures between network components, the VoIP PBX, Client Devices and the public switched telephone network (PSTN). The unidirectional bypass system, in response to detection of an outage, determines error-handling procedures for the unidirectional bypass based on bypass configuration data. The bypass enablers forward incoming communications between the PSTN and a bypass destination following a bypass route in accordance the error-handling procedures, by bypassing components that are currently experiencing failures or overloads.

28 Claims, 4 Drawing Sheets

(56) References Cited

U.S. PATENT DOCUMENTS

| | | | |
|---|---|---|---|
| 6,826,173 B1* | 11/2004 | Kung | H04L 12/14 370/261 |
| 7,508,754 B1 | 3/2009 | Sankaranaraynan et al. | |
| 7,639,793 B1* | 12/2009 | Croak et al. | 379/221.01 |
| 7,865,556 B2 | 1/2011 | Kadashevich | |
| 7,983,148 B1* | 7/2011 | Abramson | H04L 43/0811 370/217 |
| 8,576,700 B2 | 11/2013 | Boudreaux et al. | |
| 9,025,438 B1* | 5/2015 | Palmer | H04L 45/28 370/217 |
| 9,264,299 B1* | 2/2016 | Palmer | H04L 41/0654 |
| 2005/0180396 A1* | 8/2005 | Lim | 370/352 |
| 2006/0002290 A1 | 1/2006 | Chen | |
| 2006/0072726 A1 | 4/2006 | Klein et al. | |
| 2007/0070976 A1* | 3/2007 | Mussman | H04L 12/6418 370/351 |
| 2008/0101344 A1* | 5/2008 | Karimi-Cherkandi | H04L 29/06027 370/352 |
| 2008/0130856 A1 | 6/2008 | Ku et al. | |
| 2008/0310607 A1* | 12/2008 | Jachner | H04M 3/42314 379/93.21 |
| 2008/0317011 A1* | 12/2008 | Datta | H04L 12/4633 370/356 |
| 2009/0122728 A1* | 5/2009 | Aaltonen | G06Q 30/02 370/259 |
| 2010/0162034 A1* | 6/2010 | Degenhardt | H04L 65/1053 714/4.11 |
| 2010/0216476 A1 | 8/2010 | Gupta et al. | |
| 2010/0220585 A1* | 9/2010 | Poulson | H04L 45/22 370/216 |
| 2010/0223494 A1* | 9/2010 | Degenhardt | H04L 65/1053 714/4.1 |
| 2011/0041002 A1* | 2/2011 | Saavedra | H04L 41/5009 714/4.11 |
| 2011/0206037 A1* | 8/2011 | Zhakov | H04M 3/42017 370/352 |
| 2011/0211572 A1* | 9/2011 | Campion | H04L 12/66 370/352 |
| 2011/0230196 A1 | 9/2011 | Tal et al. | |
| 2011/0261946 A1* | 10/2011 | Conroy | H04M 7/009 379/242 |
| 2011/0320140 A1 | 12/2011 | Butler et al. | |
| 2012/0167208 A1 | 6/2012 | Buford | |
| 2012/0213060 A1* | 8/2012 | Poulson | H04L 45/22 370/225 |
| 2012/0239822 A1* | 9/2012 | Poulson | H04L 41/0668 709/239 |
| 2014/0050083 A1* | 2/2014 | Layman | H04L 12/56 370/230 |
| 2014/0317440 A1* | 10/2014 | Biermayr | H04L 41/0668 714/4.11 |
| 2015/0381809 A1* | 12/2015 | Fleming | H04M 3/5158 379/265.11 |
| 2016/0065624 A1* | 3/2016 | Cliche | H04L 65/1069 370/352 |

OTHER PUBLICATIONS

Written Opinion Report mailed Jul. 14, 2014 for Application PCT/US2014/026095.

* cited by examiner

METHOD AND SYSTEMS FOR AN INCOMING UNIDIRECTIONAL OUTAGE BYPASS FOR A VOICE OVER INTERNET PROTOCOL PRIVATE BRANCH EXCHANGE SYSTEM

CROSS-REFERENCE TO RELATED APPLICATIONS

This invention is a Continuation-In-Part of application Ser. No. 13/680,067, Filed Nov. 18, 2012, entitled "Methods and Systems For Bidirectional Outage Bypass For A Voice Over Internet Protocol Private Branch Exchange," the entirety of which is incorporated herein by reference.

FIELD OF THE INVENTION

The present invention relates generally to Voice-over-Internet-Protocol (VoIP) and Session Initiation Protocol (SIP) electronic communications and, more particularly, to methods and systems for providing unidirectional bypass outage protection for incoming communications for both VoIP Private Branch Exchange (PBX) failures and Internet service failures.

BACKGROUND OF THE INVENTION

A Private Branch Exchange (PBX) is a telephone exchange that makes connections among the internal telephones of an organization, such as a private business or telephone network. The PBX allows these internal telephones to connect to the public switched telephone network (PSTN) via trunk lines and/or the Internet. A hosted PBX system delivers PBX functionality as a service via the PSTN and/or the Internet. A telephone company typically provides hosted PBXs using equipment located on the premises of the telephone company's exchange. A hosted PBX system means the customer organization does not need to buy or install PBX equipment and this gives the customer organization more flexibility because the telephone company can use the same switching equipment to service multiple PBX hosting accounts. Furthermore, voice over Internet protocol (VoIP) gateways can be combined with traditional PBX functionality enabling businesses and organizations to use their managed Internet/Intranet to help reduce long distance expenses and to enjoy the benefits of a single network for voice and data, which gives greater cost savings, mobility and increased redundancy.

For users that rely on a VoIP PBX system for their organization's primary communications system, reliability of the system to complete phone calls is a major concern; of particular concern is what will happen if the system becomes overloaded or the system goes down. This concern may be further exacerbated if the organization relies on a hosted VoIP PBX wherein the PBX service is accessed over the Internet and shared with many other organizations, and therefore the service may be subject to greater possibility of overload or interruption due to Internet service outages.

The requirements of a hosted VoIP PBX have created the need for a new kind of outage bypass solution. Pre-existing systems fail to protect users against failure and overload of the VoIP PBX and/or the Internet service used to connect the VoIP PBX to the users' calling devices. Without such an outage bypass solution, if the VoIP PBX has a failure or if there are network or other problems with the connection to a user's SIP devices (telephone terminal), then users are no longer able to make or receives calls, and callers receive no notification about what sort of problem exists. Pre-existing systems may have provided some level of unidirectional bypass or override, but heretofore no system has existed that provides incoming unidirectional bypass with outage protection for both VoIP PBX overload or failure and also Internet service failure or interruption combined with a configurable problem notification capability.

The present invention meets one or more of the above-referenced needs as described herein in greater detail.

SUMMARY OF THE INVENTION

The present invention relates generally to Voice-over-Internet-Protocol (VoIP) and Session Initiation Protocol (SIP) electronic communications and, more particularly, to methods and systems for providing an incoming unidirectional outage bypass for a VoIP private branch exchange (PBX) system. Briefly described, aspects of the present embodiments include the following.

In a first aspect, the present embodiment provides a method for an incoming unidirectional outage bypass system for a hosted VoIP PBX system. The system comprises a client device or a group of client devices in communication with an outage monitoring system. The outage monitoring system is in communication with a bypass configuration system and with one or more bypass enablers. The bypass enablers act at the direction of the bypass configuration system. The outage monitoring system is configured to detect outages and overload conditions in the network components, the VoIP PBX, as well as, network failures between the VoIP PBX and the PSTN in communication with the VoIP PBX. The bypass configuration system, in response to an outage detection, directs the bypass enablers to route incoming communications between the PSTN and the client devices while bypassing the network components and/or VoIP PBX components that are currently experiencing failures or overloads. Next the bypass configuration system directs the routing of the incoming communications via the bypass enablers based on a set of bypass configuration data.

In a further aspect, a predetermined set of rules for responding to outages and overload conditions in the VoIP PBX system is included in the bypass configuration data. The bypass configuration system also uses call routing metadata to allow an edge server to route the incoming communications to the client devices based on the predetermined set of rules. The bypass configuration system further uses data from the edge server to configure the bypass enablers based on the predetermined set of rules for routing incoming communications to a client device. The routing of data from the edge server is used to configure the bypass enablers based on the predetermined set of rules for forwarding the incoming communications to an alternate number. The routing data from the edge server is also used to configure the bypass enablers based on the predetermined set of rules for forwarding the incoming communications to a voice mail system. The predetermined set of rules can also be used to direct the bypass configuration system to play a configurable audio message in response to incoming communications. The predetermined set of rules allows the edge server and/or the bypass system to reroute calls to a caller notification system.

In another aspect, a method for providing a unidirectional outage bypass system for a hosted VoIP PBX system provides an outage monitoring system in communication with a bypass configuration system and in communication with one or more bypass enablers and an edge server that act at the direction of the bypass configuration system. The system configures the outage monitoring system to detect outages and overload conditions in the network components, the VoIP PBX, as well as, network failures between the VoIP PBX and the PSTN and/or network failures between the VoIP PBX and a client device or a group of client devices. The system also directs the bypass enablers to route incoming communications between the PSTN and the client devices while bypassing the network components and/or VoIP PBX components that are currently experiencing failures or overloads using the bypass configuration system, in response to the outage detection. Next the system uses the bypass enabler to direct the routing of the incoming communications based on a set of bypass configuration data.

In a further aspect, a method for responding to outages and overload conditions in the VoIP PBX system by applying a predetermined set of rules taken from the bypass configuration data is described. In one aspect the bypass enablers gather routing information from an edge server and intercept incoming communications so that the communications can be routed by way of a bypass configuration system based on the predetermined set of rules. The bypass configuration system uses the predetermined set of rules for routing incoming communications to the client devices. The bypass configuration system is configured based on the predetermined set of rules for limiting the types of incoming communications allowed by the system. The types of incoming communications may be limited to specific types of calls or communications. The bypass configuration system, based on the predetermined set of rules, directs the unidirectional outage bypass system to play a configurable audio message in response to incoming communications. The predetermined set of rules can also be used to allow the bypass enablers to route the incoming communications to a specific group of client devices.

In another aspect, the system provides a unidirectional outage bypass for a hosted VoIP PBX system by providing an outage monitoring system configured to detect outages and overload conditions of network components, the VoIP PBX, as well as, network failures between the VoIP PBX and one or more client devices. The outage monitoring system is further configured to detect outages and overload conditions as well as network failures between the VoIP PBX and the PSTN. A bypass configuration system is in communication with an edge server and the outage monitoring system for error handling in response to the detected outages, overload conditions, and network failures and for directing one or more bypass enablers to route incoming communications based on a set of bypass configuration data.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Before the present methods and systems are disclosed and described in greater detail hereinafter, it is to be understood that the methods and systems are not limited to specific methods, specific components, or particular implementations. It is also to be understood that the terminology used herein is for the purpose of describing particular aspects and embodiments only and is not intended to be limiting.

As used in the specification and the appended claims, the singular forms "a," "an," and "the" include plural referents unless the context clearly dictates otherwise. Similarly, "optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and is not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed herein are components that can be used to perform the disclosed methods and systems. It is understood that when combinations, subsets, interactions, groups, etc. of these components are disclosed that although specific reference to each various individual and collective combinations and permutations cannot be explicitly disclosed, each is specifically contemplated and incorporated herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices. An exemplary computer system is detailed in the discussion of FIG. 4 below.

Embodiments of the methods and systems are described below with reference to block and flowchart diagrams of methods, systems, apparatuses and computer program products. It will be understood that each block of the block diagrams and flowchart diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks contained in the block diagram and flowchart diagrams support combinations of means for performing the specified functions, combinations of steps for performing the specified functions and program instruction means for performing the specified functions. It will also be understood that each block of the block diagram and flowchart diagrams, and combinations of blocks in the block diagram and flowchart diagrams, can be implemented by special purpose hardware-based computer systems that perform the specified functions or steps, or combinations of special purpose hardware and computer instructions.

Figure 1:
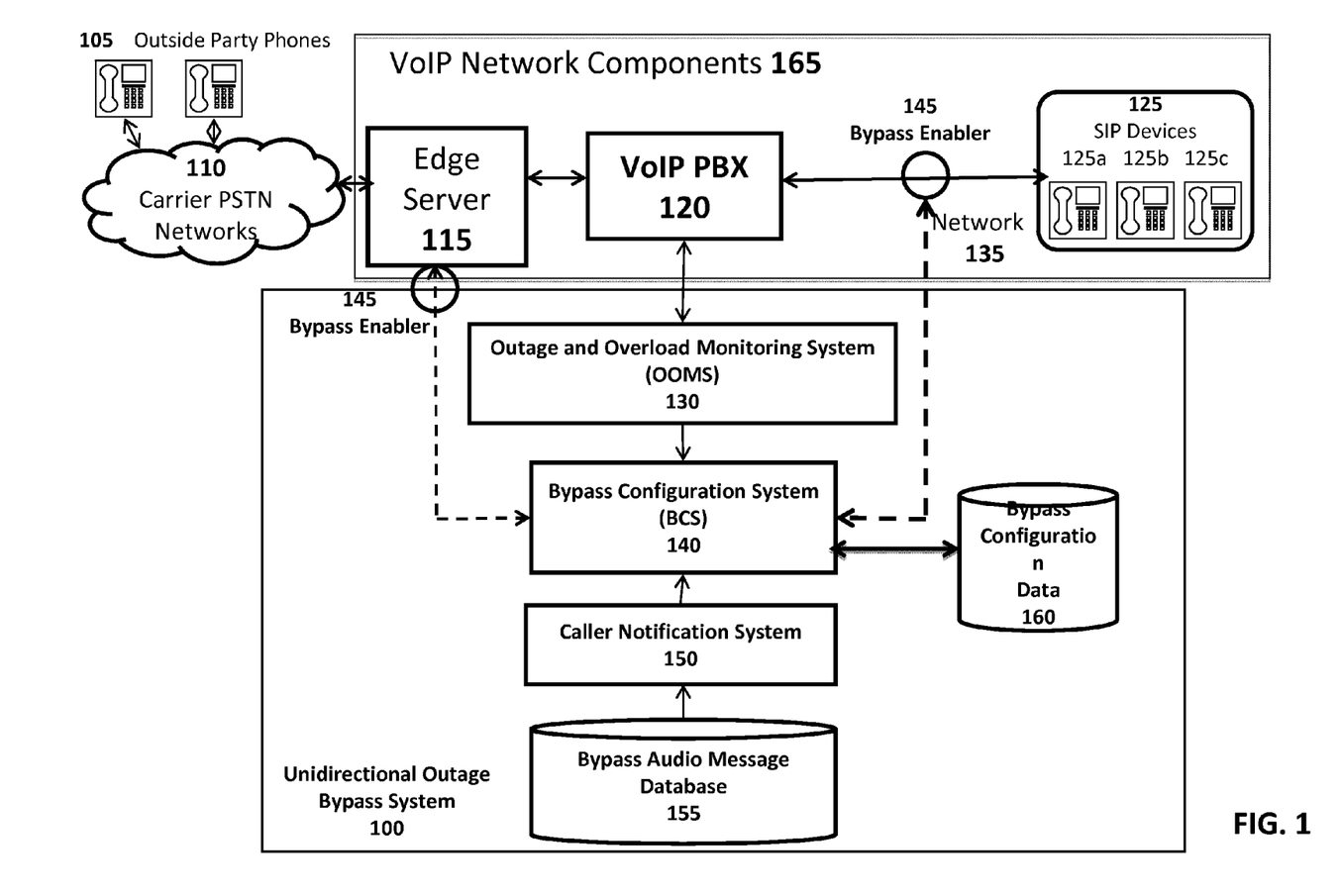
FIG. 1 is a flowchart diagram of an exemplary embodiment of a unidirectional outage bypass system for hosted VoIP PBX.

FIG. 1 is a flow chart diagram that details the various aspects of an exemplary embodiment in which the present methods and systems can operate. The present disclosure relates to methods and systems for providing a unidirectional bypass system that monitors a VoIP PBX, the SIP devices (which are client devices, such as Internet-based telephone terminals) that register directly and interact with the VoIP PBX, and the network connections between the VoIP PBX and a plurality of SIP Devices. Those skilled in the art will appreciate that present methods may be used in systems that employ both digital and analog equipment. One skilled in the art will also appreciate that provided herein is a functional description and that the respective functions can be performed by software, hardware, or a combination of software and hardware.

Turning now to FIG. 1, the unidirectional outage bypass system 100 includes an outage or overload monitoring system (OOMS) 130 that monitors the VoIP PBX 120, the SIP Devices 125 a,b,c that register directly and interact with the VoIP PBX 120, and the network connections 135 between the VoIP PBX 120 and the SIP Devices 125 a,b,c. The OOMS 130 also monitors the connection between the Edge Server 115 and the VoIP PBX 120. In the case of component outages, failures, or overloads detected by the OOMS 130, for as long as the failures are detected, the unidirectional outage bypass system 100 can take command of incoming phone calls and provide capabilities to allow calls to be completed or handled while bypassing the failed components; or in the case where they cannot or should not be completed or handled, the unidirectional outage bypass system 100 provides an ability to notify the caller of the failures via one or more configurable audio messages.

In an exemplary embodiment, an incoming call comes from the PSTN 110 addressed to a user of one of the SIP Devices (client devices) 125. Normally the Edge Server 115 routes incoming calls through the VoIP PBX 120, which interprets the IP address of the SIP Device 125 to which the call is intended. The call is then routed through the network components 135 to the SIP Device 125. When the VoIP PBX 120 receives an incoming call it applies the appropriate calling features available to the SIP Device 125 and routes the call accordingly such that the call routing is completed.

In order to improve quality of service (QOS) of the VoIP PBX system 120, the network can include a unidirectional outage bypass system 100. In an exemplary embodiment, an incoming call initiated on the PSTN 110 and directed to a SIP Device 125 reaches an Edge Server 115 that routes the call to the VoIP PBX 120 system which directs the call over the network components 135 to the IP address of the appropriate SIP Device 125. An OOMS 130 of the unidirectional bypass system 100 monitors the VoIP PBX 120 and the network components 135 for outages or overloads that directly affect the ability of the system to complete an incoming call for users of the SIP Devices 125 over the VoIP PBX 120. This includes the VoIP PBX 120 itself which provides call routing and call-handling features such as call transfer, call forwarding, call parking, call recording, call monitoring, call hold and many other user features. This also includes the SIP Devices 125, such as SIP desk phones or SIP soft phones, which users rely on for communications via the VoIP PBX 120 to the PSTN 110. The monitoring further includes the network components 135 between the VoIP PBX 120 and the SIP Devices 125. The OOMS 130 monitors all of these components for failures that would affect the ability of the VoIP PBX 120 to route incoming calls.

The OOMS 130 monitoring can be implemented in a variety of ways. The OOMS 130 can monitor the performance of both software and hardware components with the VoIP infrastructure 100-160. In an exemplary embodiment, the OOMS 130 can monitor hardware components to receive regular heartbeats indicating health from any of VoIP Network Components 165 including the Edge Servers 115, VoIP PBX 120, SIP Devices 125, and/or network components 135. To monitor hardware for example, the OOMS 130 might send non-intrusive requests to the components and monitor the responses, or the OOMS 130 might monitor system logs to detect timeouts and other failures which can also be indicated by a failure to receive regular log updates, or any combination of these techniques or a variety of other techniques commonly used to monitor computer systems and networks. Network timeout errors can also trigger alarms that also alert the OOMS 130 of the need to bypass certain components on the network. In a further embodiment, the OOMS 130 may incorporate hardware component monitoring systems from third party vendors such as those provided by Cisco, Inc., Paessler, Inc. and the like The OOMS 130 can also monitor software performance in determining failure and overload conditions among the VoIP Network Components 165. This may include monitoring VoIP call quality by measuring the mean opinion score (MOS) or via other techniques for measuring VoIP audio codecs. Furthermore, the OOMS 130 can monitor the VoIP PBX 120 for specific known overload or failure indicators. For example, in one embodiment the OOMS 130 may monitor the number of concurrent active calls being processed. For example, the OOMS 130 may recognize when the VoIP PBX 120 exceeds a predetermined number of active calls, which might degrade MOS or other call quality metrics. The OOMS 130 may then bypass the VoIP for future incoming calls in order to avoid exceeding the capacity of the VoIP PBX 120. Similarly in an embodiment, the OOMS 130 might monitor components of the VoIP PBX for overload or failure, such as the voicemail processing component, the call recording component, or the conference calling component, and calls may be routed around the VoIP PBX 120 accordingly if it is determined that these failures might impact call quality. The OOMS 130 may proactively monitor parameters essential to VoIP performance, including jitter, packet loss, latency and other calculated performance values. The monitor for MOS can comprise a configurable active monitor for MOS that can trigger an alert if network degradation causes the MOS value to drop below a user configured threshold. The OOMS 130 may further access the MOS for the voice call quality in determining if certain network components or other system components should be bypassed. In an embodiment the OOMS 130 can determine which components in the system 165 are impacting the MOS and perform alternate call routing to avoid these failed components. In an alternative embodiment, the OOMS 130 can be configured to switch to alternative compression codecs to improve VoIP call quality on the network if the current codecs are not optimized to perform under current network or other system conditions. As mentioned above, the OOMS 130 can include internal software components and/or other third party software and hardware components for monitoring network performance and health.

When a user attempts to receive a call using a SIP Device 125, the OOMS 130 monitors the VoIP Network Components 165 as described above. In an exemplary embodiment, once the OOMS 130 detects a problem, it alerts the bypass configuration system (BCS) 140. The BCS 140 receives notifications from the OOMS 130 indicating the specific problems detected and in some cases, such as network or device outages, the specific users or calls being affected. Upon an indication of an outage or failure, the BCS 140 then monitors the network for incoming calls that it determines cannot be completed due to the indicated component failure(s).

In an exemplary embodiment, for every incoming phone call where the BCS 140 has determined action is required due to a fault detection by the OOMS 130 of one or more component failures, the BCS 140 component performs a lookup from a connected bypass configuration database 160. The bypass configuration database 160 might be local or remote to the BCS 140, and the storage might be in memory, on disk, or on any other digital storage medium capable of lookup and retrieval of data upon request. The BCS 140 retrieves pre-configured data that provides instructions on how specific incoming calls should be routed or handled. This data might be associated with specific call locations as indicated by the numbers dialed by the caller initiating a phone call, or the data might be associated with a specific user (or group of users) of the VoIP PBX 120 or a specific SIP device 125 (or group of devices) that is experiencing an outage affecting its ability to receive incoming calls. For example, in an embodiment, the bypass configuration database 160 might specify that an incoming call for a specific SIP Device 125 on the network associated with the VoIP PBX 120 should be rerouted, in the case of an outage at the VoIP PBX 120, directly between the edge server 115 and the SIP Device 125. The BCS 140 queries the bypass configuration database 160 to determine how the particular incoming call should be routed or processed. For example, the bypass configuration database 160 might specify an incoming call for a SIP Device 125 connected to a failed VoIP PBX 120 should be routed to an alternative number or to a voice mail system. The bypass configuration database 160 can also require, in the case of an outage, that calls be routed along a certain network path, such as the Edge Server 115, which determines the IP address associated with the SIP Device 125. The BCS 140 then routes the call directly to the associated SIP Device 125, thereby bypassing the failed VoIP PBX 120. Meanwhile, in an alternative embodiment, the bypass configuration data 160 can specify that calls to other specific SIP Devices 125 should not be rerouted at all.

For each incoming phone call, according to the bypass actions indicated by the bypass configuration data 160 retrieved, the BCS 140 can attempt to complete the incoming call while bypassing the VoIP PBX 120 system and network components 135 where failures or outages have been detected by the OOMS 130. In an exemplary embodiment, to reroute a phone call while bypassing the VoIP PBX 120 and/or a failed network component 135 the BCS 140 interacts with one or more bypass enablers 145 that are directly in the path of network communications to and from the VoIP PBX 120 and therefore are directly in the path of the network packets that comprise incoming SIP and VoIP communications. The bypass enablers 145 could be one of a variety of network devices, software components, or servers of various types that are capable of intercepting SIP and VoIP communications and performing the necessary interactions to reroute or forward these communications directly from the carrier PSTNs 110 and directly to the SIP Devices 125. For example, the bypass enabler 145 can be network switch/router, or a proxy/load balancer type inline network device, all which can be used to redirect network traffic w/dynamic configuration changes. The bypass enabler 145 can also be a DNS server, in which case the client (in this case the sip device 125) does a DNS lookup to find a destination, and in case of outage rerouting, the BCS 140 would update the DNS server so that it would give the sip device 125 an alternate address to use. In some cases, the BCS 140 may interact with the bypass enabler 145 to forward a phone call to an alternate network path.

In a further exemplary embodiment, if the BCS 140 of the unidirectional outage bypass system 100 detects an outage, as indicated by the OOMS 130, it then retrieves bypass configuration data 160. Based on the bypass configuration data 160, the BCS 140 determines that for a specific incoming phone call it either lacks sufficient information to determine a bypass route or that it is specifically prohibited from performing bypass for the specific call, for example a call from a source like an international caller for which bypass is not supported, then the BCS 140 can take alternative actions.

A further exemplary embodiment can be implemented wherein, in the case of incoming phone calls wherein bypass configuration data 160 is missing or bypass is not allowed, then the BCS 140 makes use of a caller notification system 150 to provide an alert to the caller using one or more caller notification audio messages. The caller notification system 150 retrieves audio messages that are stored in a local or remote data storage system, such as a bypass audio message database 155. The caller notification system 150 can configure the audio messages for specific SIP Devices 125 or groups of SIP Devices 125 (or specific users or groups of users), specific types of calls, specific outage conditions, specific calling locations, or any combination of these or other attributes that can logically be associated with calls to users of the VoIP PBX 120 system. The caller notification system 150 retrieves one or more audio messages stored in the bypass audio message database 155 to be played for a caller attempting to reach a SIP Device 125 user during an incoming call. The BCS 140 interacts with one or more bypass enablers 145 to reroute the incoming call to the caller notification system 150 wherein the system is activated and a notification audio file is retrieved from the bypass audio message database 155 and played for the user initiating the incoming call and after the audio has played the call is disconnected. These actions can take place while bypassing the VoIP PBX 120 system.

In these exemplary embodiments, these methods and systems for unidirectional outage bypass for a VoIP PBX 120, involving an OOMS 130 for outage monitoring, a BCS 140 for unidirectional bypass, and a component for caller notification 150, constitutes a complete unidirectional outage bypass system 100 that provides a heretofore unavailable level of assurance for VoIP PBX 120 users that incoming calls can be routed around system failures and that in all other cases, callers can be sufficiently notified, as well as providing the ability to put in place user- and group-specific configurations for bypass actions. The unidirectional outage bypass system 100 is described in greater detail below.

Figure 2:
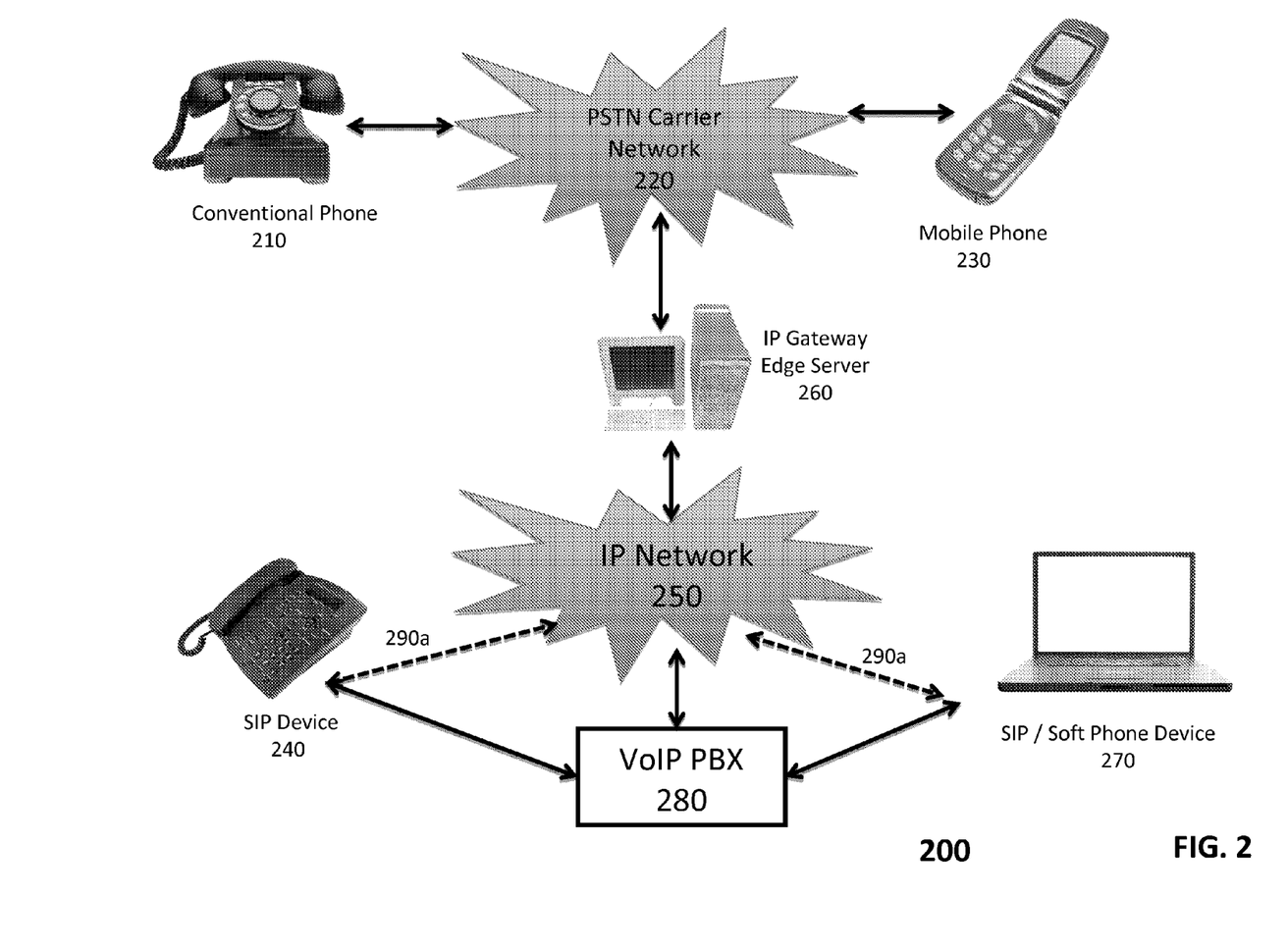
FIG. 2 is a flowchart diagram of an exemplary embodiment of a hosted VoIP to Edge Server to PSTN system.

Turning next to FIG. 2, an IP Gateway Edge Server to PSTN configuration 200 is illustrated. As shown in FIG. 2, conventional phones 210 and mobile phones 230 communicate over traditional PSTN Carrier Networks 220. SIP Devices 240 and Softphones 270 operating on a computing device can communicate with each other over Internet networks 250 using text-based Internet VoIP protocols (described below) that are engineered for high data rate links. SIP Devices 240 and Softphones 270 communicating over the IP Networks 250 can communicate with conventional phone devices 210, 230 communicating over PSTN Carrier Networks 220, via an IP Gateway Edge Server 260.

SIP Devices 240 are used to initiate and terminate VoIP calls. SIP Devices 240 are designed to mimic the call setup and signaling characteristics of the PSTN Carrier Network 220 over an IP Network infrastructure 250. A typical SIP Device 240 session involves a client requesting a session with a VoIP PBX 280 in communication with an IP Network 250 or IP Gateway Edge Server 260. After the request is received, the IP Gateway Edge Server 260 returns a response to the user SIP Device 240, 270 indicating the availability of the session. SIP protocols are ASCII text-based and share some common characteristics with HTTP. Users are identified by a SIP address, which is similar to an email address. The IP Gateway Edge Server 260 is capable of translating the ASCII text-based IP addresses of the SIP devices to traditional phone numbers so the SIP Devices 240, 270 can connect with conventional phone systems 210, 230. When incoming calls originate from conventional phones 210, 230 over the PSTN 220, the call are received by the IP Gateway Edge Server 260, which translates the dialed number into the IP address of the SIP Devices 240, 270. Typically these calls would be passed to the VoIP PBX 280 for processing and routing to the appropriate SIP Device 240, 270; however in the event of a network failure, the calls can bypass the VoIP PBX 280 and be routed directly to the SIP Device 240, 270.

SIP Devices 240, 270 rely on peer-to-peer architecture that uses intelligent network elements for advanced call processing and call management functions. These endpoints are referred to as the user client device 240, 270 and the VoIP PBX 280. The VoIP PBX server 280 can be used as an intermediary responsible for transferring the request from the client SIP Device 240, 270 to the IP Gateway Edge Server 260. VoIP PBX servers 280 can provide advanced call-processing functions including security, authentication, calling features and call routing. Real-time Transport Protocol (RTP) is used to carry the voice, data and/or video content at the application layer between SIP Devices 240, 270, the VoIP PBX server 280 and the IP Gateway Edge Server 260.

In an exemplary embodiment, in the event of a VoIP PBX 280 outage or network component failure, the SIP Devices 240, 270 can bypass the VoIP PBX server 280 and communicate directly with the IP gateway edge server 260 over the IP network 250 via the network connections 290*a* as described in the discussion of the flowchart diagram in FIG. 3 below.

Figure 3:
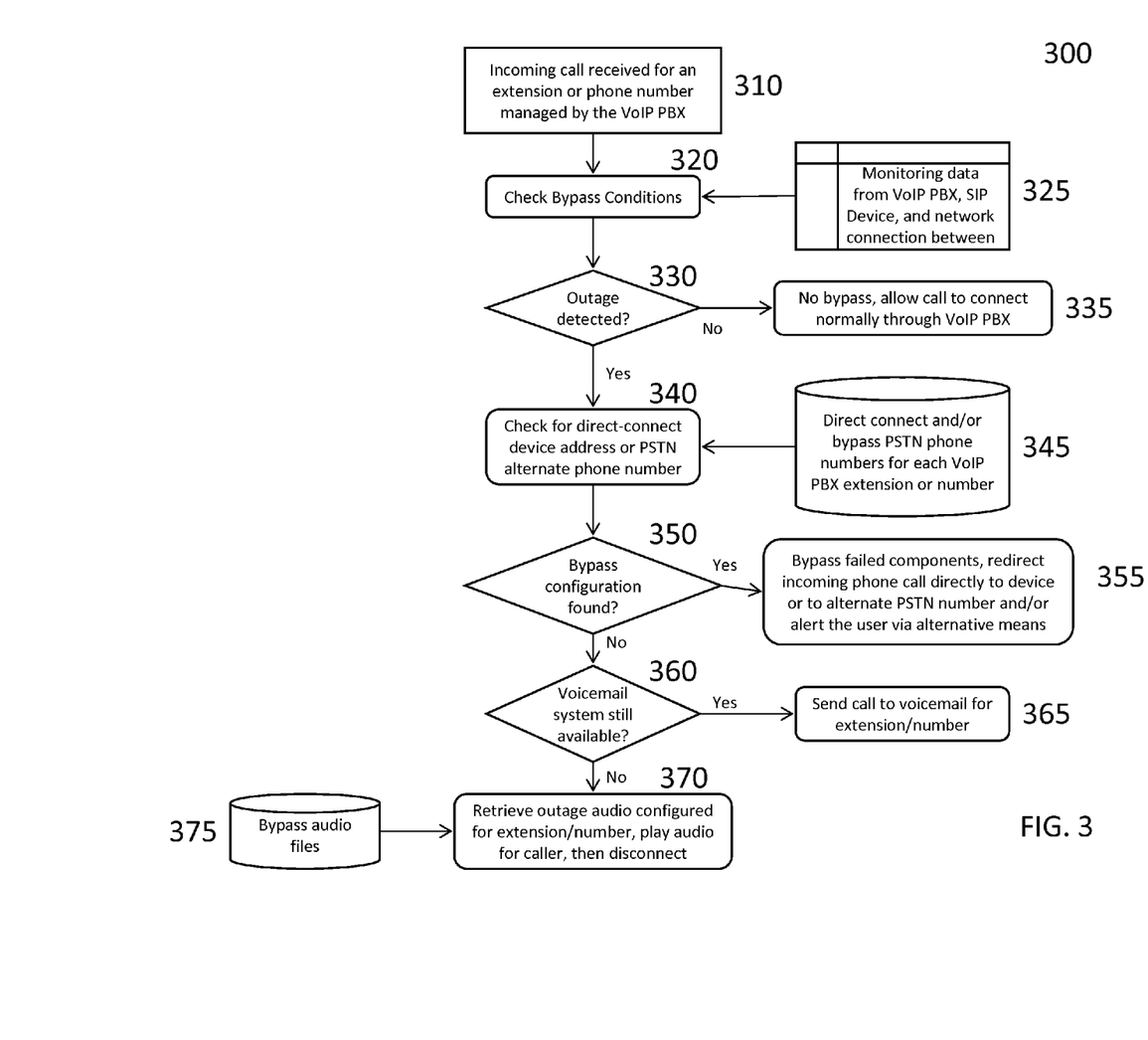
FIG. 3 is a flowchart diagram of an exemplary embodiment of a unidirectional outage bypass system for incoming communications.

Turning now to FIG. 3 in view of the system of FIG. 1, an exemplary bypass method 300 for incoming calls is described. Beginning at step 310 an incoming call from the PSTN 110 or IP network is received for an extension or phone number of a SIP Device 125 that is managed by the VoIP PBX 120. As calls come into the VoIP PBX system 120, the OOMS 130 continuously checks the VoIP PBX 120 at step 320 for failures. At step 325 the OOMS 130 continuously monitors data from the VoIP PBX 120, SIP Device 125, and/or network connections 135 between the SIP Devices 125 and the VoIP PBX 120. Therefore, in the exemplary embodiment, the OOMS 130 is continuously monitoring network connections 135, the VoIP PBX 120 system and/or SIP Devices 125 for outages or failures. This continuous checking of bypass conditions at step 320 is necessary to provide outage and failure protection. Next the method proceeds to step 330.

A decision point is reached at step 330 wherein the method determines if an outage has been detected. In an exemplary embodiment, if there is no outage or failure detected, the incoming call is allowed to connect normally via the PSTN to the edge server, the VoIP PBX 120 and eventually on to the appropriate SIP Device 125. However, in a further exemplary embodiment, if an outage or failure is detected for the VoIP PBX 120, SIP Device 125, and/or network connections 135 between the SIP Devices 125 and the VoIP PBX 120, the method determines that a bypass around the problem is necessary and therefore, it proceeds to step 340.

At step 340, the BCS 140 is activated. In an exemplary embodiment, at step 340 the bypass enabler 145 redirects the incoming call to the BCS 140, wherein the BCS 140 references the bypass configuration database at step 345. At steps 340 and 345, when the BCS 140 references the bypass configuration database 160 it determines the particular error handling procedures for the particular extension or SIP Device 125 to which the incoming call is directed. In an alternative embodiment, the error handling procedures may be specific to a particular group of extensions or SIP Devices 125. Error handling procedures could also be related to the specific problem detected, for example if the network is down then incoming calls can be routed to an alternative number via the PSTN 110, such as cell phone. If the VoIP PBX 120 is in failures (e.g. overloaded) the error handling procedures may simply route the call around the VoIP PBX 120 to the SIP Device 125 using the bypass enablers 145. In an exemplary embodiment the bypass configuration database 160 can contain error handling procedures for routing the incoming call to a direct connect number and/or a phone number on the PSTN network such as a land line or mobile phone number. In an exemplary embodiment, the bypass configuration data 160 contains error-handling procedures for each VoIP PBX extension, number and/or SIP Device 125 on its network. In a further exemplary embodiment, error handling procedures could also be related to specific source callers (as identified by the source phone number and/or caller ID), for example, do to costs concerns, calls from international sources may not be allowed to bypass to an alternative mobile phone number. Furthermore, the system may include rules for recognizing when an alternative number, such as a mobile phone, has left a specific roaming area (for example if the mobile phone is in a rural area and is roaming on a network at additional costs of if the mobile phone has been taken abroad) so that the incoming call can be routed to voice mail or an audio notification. After the method checks for the error-handling procedures at steps 340 and 345, the method continues to step 350.

In an exemplary embodiment, at step 350, a series of error-handling procedures can be found in which the BCS 140 can be used to route the incoming call and/or otherwise alert the caller or user that the call cannot be completed. Initially, for example, if the VoIP PBX 120 or other network components are affected by an outage, the error-handling procedures can reroute the incoming call at step 355 by bypassing the outage attributed to the failed VoIP PBX 120 or network components by redirecting the incoming call directly to the SIP Device 125. In the exemplary embodiment, when the VoIP PBX 120 is affected by an outage, the error-handling procedures can direct the bypass enablers to reroute an incoming call via the edge server 115 through the BCS 140 directly to the appropriate extension or SIP Device 125. However, if there is no call bypass routing available, the method will proceed to step 360.

In an exemplary embodiment, at step 360 the system checks to see if the voicemail system is active and available and whether the incoming call can be rerouted to voicemail if the error-handling procedures cannot reroute the incoming call at step 350 by bypassing the failed components and redirecting the incoming phone call directly to an alternate number or alternative SIP Device 125. However, if the voicemail system is unavailable, the system can also retrieve an audio file from a bypass audio file database 365 to alert the caller that the call cannot be completed. In an exemplary embodiment, an audio message may be used to alert the caller that the network is down or otherwise unavailable. In a further embodiment, the audio file database 365 contains a variety of messages the can be customized for a particular extension or SIP device 125. In another embodiment, the audio message selected from the audio file database can be customized to for a particular incoming phone number. Once an incoming call has been routed to voicemail system where a message recording is completed, or alternatively, an audio file has been played in response to an incoming call for a set number of times, the BCS 140 will disconnect the call.

Figure 4:
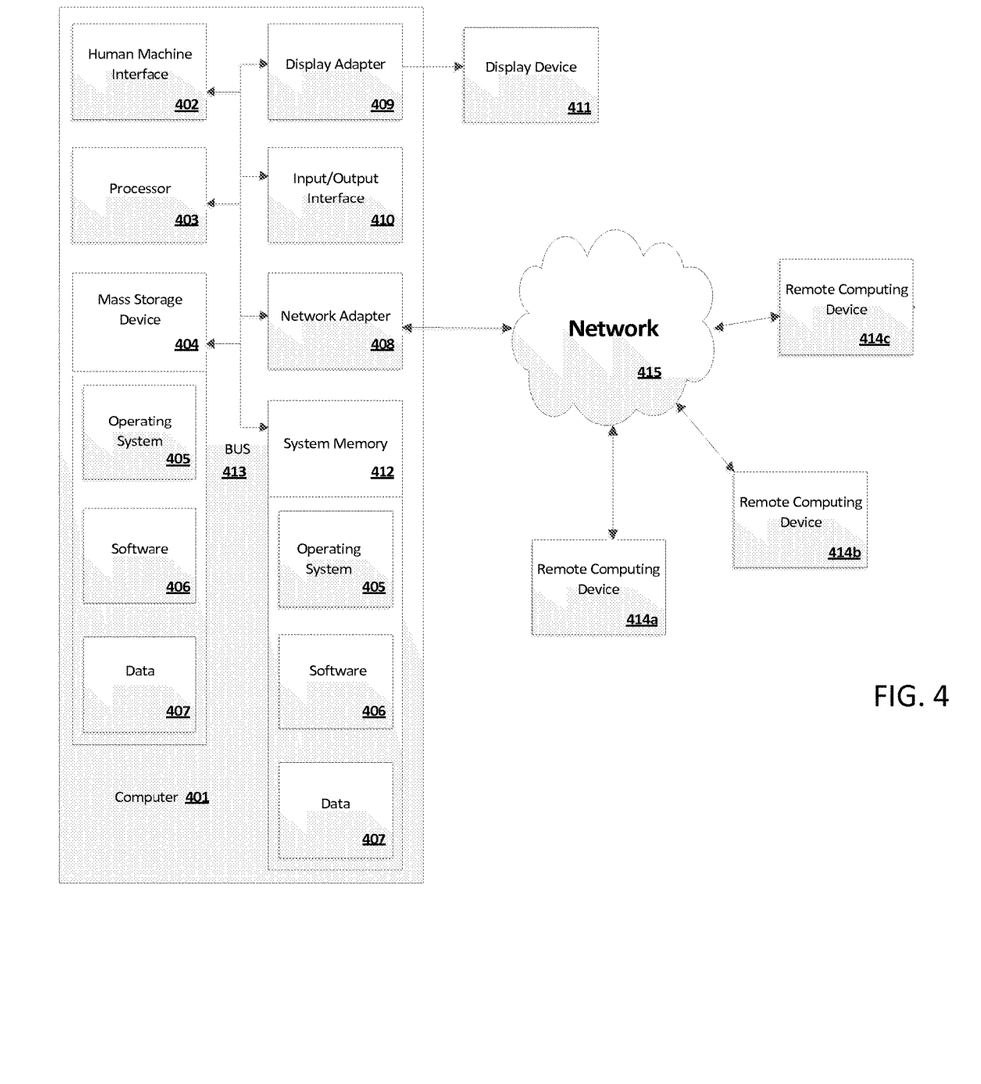
FIG. 4 is a block diagram of an exemplary computing environment that may be used in conjunction with example embodiments and aspects.

Turning now to FIG. 4, one skilled in the art will appreciate that the systems and methods disclosed herein can be implemented via a general-purpose computing device in the form a computer 401. The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Private Branch Exchange (PBX) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 413, and all buses specified in this description can also be implemented over a wired or wireless network connection and each of the subsystems, including the processor 403, a mass storage device 404, an operating system 405, software 406, data 407, a network adapter 408, system memory 412, an input/output interface 410, a display adapter 409, a display device 411, a human machine interface 402, can be contained within one or more remote computing devices 414 $a,b,c$ at physically separate locations, connected through buses of this form, in effect implementing a fully distributed system.

The computer 401 typically comprises a variety of computer readable media. Exemplary readable media can be any available media that are accessible by the computer 401 and comprise, for example, both volatile and non-volatile media, as well as, removable and non-removable media. The system memory 412 comprises computer readable media in the form of volatile memory, such as random access memory (RAM), and/or non-volatile memory, such as read only memory (ROM). The system memory 412 may contain data such as media, video, audio, or other data 407 and/or program modules such as an operating system 405 and software 406 capable of manipulating, translating, transcoding, or otherwise editing the data 407 that are immediately accessible to and/or presently operated on the by the processing unit 403.

In another aspect, the computer 401 can also comprise other removable/non-removable, volatile/non-volatile computer storage media. By way of example, FIG. 4 illustrates a mass storage device 404, which can provide non-volatile storage of computer code, computer readable instructions, data structures, program modules and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and hosted VoIP PBX software 406. Both the operating system 404 and hosted VoIP PX software 406 (or some combination thereof) can comprise elements of the programming and the hosted VoIP PX software 406. Media, video, audio, or other data 407 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems. Examples of hosted VoIP PX software include Asterisk®, FreeSwitch®, or Microsoft Lync® server software.

In another aspect, the user can enter commands and information into the computer 401 via client device or an input device (not shown). Example of such input devices comprise a keyboard, pointing device (e.g., a "mouse"), a microphone, a joystick, a scanner, tactile input devices such as gloves, and other body coverings, and the like. These and other input devices can be connected to the processing unit 403 via a human machine interface 402 that is coupled to the system bus 413, but also can be connected by other interface and bus structures, such as a parallel port, game port, IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409, and the computer 401 can have more than one display device 411. For example, a display device can be a monitor, an LCD (Liquid Crystal Display), or a projector. In addition to the display device 411, other output peripheral devices can comprise components such as speakers (not shown) and a printer (not shown), which can be connected to the computer 401 via input/output interface 410. Any step and/or result of the methods can be output in any form to an output device. Such output can be any form of visual representation, including but not limited to, textual, graphical, animation, audio, tactile, and the like. The display 411 and computer 401 can be part of one device, or separate devices.

The computer 401 can operate in a networked environment using logical connections to one or more remote computing devices 414 a,b,c. By way of example, a remote computing device can be a personal computer, portable computer, smartphone, softphone, client device, a server, a router, a network computer, a peer device or other common network node, and so on. Logical connections between the computer 401 and remote computing device 414 a,b,c can be made via a network 415, such as a local area network (LAN) and or a general wide area network (WAN). Such network connections can be through a network adapter 408. A network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of media manipulation software 406 can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence (AI) techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent system (e.g. expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for providing a unidirectional outage bypass for a hosted Voice-over Internet Protocol (VoIP) private branch exchange (PBX) comprising:
   a client device or a group of client devices in a network in communication with the hosted VoIP PBX and with an outage monitoring system, the hosted VoIP PBX being hosted remote from the client device or the group of client devices;
   the outage monitoring system in communication with a bypass configuration system and in communication with one or more bypass enablers that act at the direction of the bypass configuration system, the one or more bypass enablers being one or more of software and hardware and being configured to intercept incoming communications and perform interactions to reroute or forward the incoming communications from a public switched telephone network (PSTN) to the client device or the group of client devices while bypassing the hosted VoIP PBX, wherein:
      the outage monitoring system monitors the hosted VoIP PBX, as well as, network connections between the hosted VoIP PBX, client devices and a public switched telephone network (PSTN) for outages, failures and overload conditions;

the bypass configuration system, in response to at least one of an outage failure, and an overload detection by the outage monitoring system, directs the bypass enablers to route the incoming communications between the PSTN and the client devices while bypassing one or more of the hosted VoIP PBX, and the network connections between the hosted VoIP PBX, client devices and the PSTN that is currently experiencing at least one of outage, failure and overload; and the bypass configuration system directs the routing of the incoming communications via the bypass enablers based on a set of bypass configuration data.

2. The system according to claim 1, wherein a predetermined set of rules for responding to outages and overload conditions in the hosted VoIP PBX is included in the bypass configuration data.

3. The system according to claim 2, wherein the bypass configuration system directs the bypass enablers to route the incoming communications to the client devices based on the predetermined set of rules.

4. The system according to claim 3, wherein an edge server provides Internet protocol (IP) addressing information associated with a specific client device on the network to allow the incoming communication to bypass the hosted VoIP PBX such that the incoming communication is routed directly to the specific client device.

5. The system according to claim 2, further comprising an edge server configured based on the predetermined set of rules for forwarding the incoming communications to an alternate number.

6. The system according to claim 2, wherein the bypass configuration system forwards an incoming communication to a voice mail system based on the predetermined set of rules.

7. The system according to claim 2, wherein the bypass configuration system routes an incoming communication to a caller notification system for playing a pre-configured audio message to a caller.

8. The system according to claim 2, wherein the bypass configuration system routes an incoming communication to a caller notification system for playing a pre-configurable audio message to a caller in response an incoming communication from a specific phone number.

9. A method for providing a unidirectional outage bypass for a hosted Voice-over Internet Protocol (VoIP) private branch exchange (PBX) comprising:

providing a client device or group of client devices on a hosted VoIP PBX, the hosted VoIP PBX being hosted remote from the client device or group of client devices;

monitoring the hosted VoIP PBX with an outage monitoring system in communication with a bypass configuration system and in communication with one or more bypass enablers that act at the direction of the bypass configuration system wherein the monitoring comprises:

monitoring the hosted VoIP PBX for at least one of outages and overload conditions, as well as for network failures between the hosted VoIP PBX and a public switched telephone network (PSTN) and for network failures between the hosted VoIP PBX and the client device or the group of client devices;

directing the bypass configuration system, in the event of at least one of a detected outage, overload, and failure by the outage monitoring system, to route incoming communications between the PSTN and the client device or the group of client devices via the bypass enablers; and using the bypass enablers to direct the routing of the incoming communications based on a set of bypass configuration data, wherein the one or more bypass enablers comprise one or more of software and hardware and are configured to intercept incoming communications and perform interactions to reroute or forward the incoming communications from the PSTN to the client device or group of client devices while bypassing the hosted VoIP PBX.

10. The method according to claim 9, further including a predetermined set of rules for responding to outages and overload conditions in the hosted VoIP PBX in the bypass configuration data.

11. The method according to claim 10, further comprising directing the bypass enablers to route the incoming communications directly to the client device or the group of client devices based on the predetermined set of rules.

12. The method according to claim 10, further comprising using an edge server to provide Internet protocol (IP) addressing information associated with a specific client device on the network to allow the incoming communication to bypass the hosted VoIP PBX such that the incoming communication is routed directly to the specific client device.

13. The method according to claim 10, further comprising routing incoming communications to a client device based on the predetermined set of rules.

14. The method according to claim 13, further comprising routing incoming communications to an alternative phone number based on the predetermined set of rules.

15. The method according to claim 10, further comprising routing incoming communications to a caller notification system for playing a pre-configured audio message based on the predetermined set of rules.

16. The method according to claim 10, further comprising routing incoming communications to a caller notification system for playing a pre-configured audio message based on the phone number of the incoming call.

17. A system of providing a unidirectional outage bypass for a hosted Voice-over Internet Protocol (VoIP) private branch exchange (PBX) comprising:

an outage monitoring system configured to detect outages and overload conditions of the hosted VoIP PBX, as well as, network failures between the hosted VoIP PBX, a public switched telephone network (PSTN) and one or more client devices, the hosted VoIP PBX being hosted remote from the one or more client devices; and a bypass configuration system in communication with an edge server, the outage monitoring system and one or more bypass enablers for routing incoming communications based on a set of bypass configuration data, wherein the one or more bypass enablers comprise one or more of software and hardware and are configured to intercept incoming communications and perform interactions to reroute or forward the incoming communications from the PSTN to the one or more client devices while bypassing the hosted VoIP PBX.

18. The system according claim 17, wherein a predetermined set of rules for responding to outages and overload conditions in the hosted VoIP PBX components are included in the bypass configuration data.

19. The system according claim 18, wherein the predetermined set of rules direct the unidirectional outage bypass system to play a configurable audio message to callers attempting an incoming communication.

20. The system according claim 17, wherein the unidirectional outage bypass system, in response to a network outage, directs incoming communications from the public switched telephone network (PSTN) to a client device by bypassing the hosted VoIP PBX.

21. The system according to claim 17, wherein outages, overloads, and failures of the hosted VoIP PBX include any interruption in network, hardware, or software services.

22. The system according to claim 21, wherein failures of the hosted VoIP PBX hardware and software services includes an inability to complete incoming and/or outgoing communications through the hosted VoIP PBX.

23. The system according to claim 21, wherein failures of the hosted VoIP PBX hardware and software services include an inability to provide calling features including at least one of call transfer, call hold, call forwarding, call parking, call recording, and call monitoring, through the hosted VoIP PBX.

24. The system according to claim 17, wherein the outage monitoring system is capable of detecting outages, overloads, and failures of the hosted VoIP PBX using hardware and/or software monitoring techniques.

25. The system according to claim 24, wherein the hardware monitoring techniques comprise examining at regular intervals data sent to and/or retrieved from the hosted VoIP PBX wherein failure conditions are triggered by specific monitoring data indicating overload or outages in any or all of network latency, or network jitter within the hosted VoIP PBX noticeably affecting the quality of VoIP performance.

26. The system according to claim 24, wherein software monitoring techniques comprise examining at regular intervals data sent to or retrieved from the hosted VoIP PBX wherein failure identifiers are triggered by specific monitoring data indicating overload or outages in any or all of network latency, or network jitter within the hosted VoIP PBX noticeably affecting the quality of VoIP performance.

27. The system according to claim 24, wherein software monitoring techniques comprise examining at regular intervals a mean opinion score (MOS) and other quality of service (QoS) measures for voice call quality to determine if there are performance factors impacting the network and whether the hosted VoIP PBX should be bypassed.

28. The system according to claim 27, wherein software monitoring techniques include a configurable active monitor for MOS or other QoS measures that trigger an alert if network degradation causes the MOS value to drop below a user configured threshold.

* * * * *